United States Patent [19]
Pester

[11] Patent Number: 5,945,194
[45] Date of Patent: Aug. 31, 1999

[54] FENDER COVER

[76] Inventor: Craig S. Pester, 6100 S. 28th St., Lincoln, Nebr. 68516

[21] Appl. No.: 08/982,503

[22] Filed: Dec. 2, 1997

[51] Int. Cl.$^6$ ....................................................... B32B 3/06
[52] U.S. Cl. ........................... 428/120; 428/192; 280/770; 150/166
[58] Field of Search ............................ 428/99, 120, 192; 280/770; 150/166

[56] References Cited

U.S. PATENT DOCUMENTS

| | | | |
|---|---|---|---|
| D. 323,639 | 2/1992 | Creamer | D12/155 |
| D. 345,332 | 3/1994 | Roman | D12/184 |
| D. 354,264 | 1/1995 | McCoy | D12/167 |
| D. 354,937 | 1/1995 | Nentwich | D12/400 |
| 3,665,355 | 5/1972 | Sasaki et al. | 335/306 |
| 4,849,272 | 7/1989 | Haney et al. | 428/102 |
| 4,884,824 | 12/1989 | Radke | 280/770 |
| 4,895,753 | 1/1990 | Etter | 428/286 |
| 5,042,836 | 8/1991 | Swanson | 280/770 |
| 5,129,678 | 7/1992 | Gurbacki | 280/770 |
| 5,195,778 | 3/1993 | Dismuke | 280/770 |
| 5,209,545 | 5/1993 | Slaugh | 296/136 |
| 5,273,316 | 12/1993 | Infante | 280/770 |
| 5,280,989 | 1/1994 | Castillo | 296/136 |
| 5,290,618 | 3/1994 | Olson et al. | 428/100 |
| 5,799,975 | 9/1998 | Crick | 150/166 |

*Primary Examiner*—Alexander Thomas
*Attorney, Agent, or Firm*—Zarley, McKee, Thomte, Voorhees & Sease; Dennis L. Thomte

[57] ABSTRACT

A fender cover includes a generally planar sheet of resilient, flexible, pliant, water-impervious material with a plurality of pockets formed along one edge. The pockets are filled with a high density deformable flowable material such as sand, and are separated by flat valleys, to permit folding of the sheet between the pockets. A first ridge is formed in the sheet proximal the pockets in extending between the side edges, and projecting upwardly from the sheet. A second ridge is formed parallel and rearwardly of the first ridge and also extends from side edge to side edge. Both ridges are preferably formed of loops of the material, gathered together and affixed in a loop. Each ridge forms a hinge-type joint permitting pivotal movement of the pockets to a position generally perpendicular to the sheet at a location rearward of the ridge.

11 Claims, 4 Drawing Sheets

FENDER COVER

TECHNICAL FIELD

The present invention relates generally to covers for automobile exterior surfaces, and more particularly to an improved fender cover which is non-magnetically attached to a vehicle.

BACKGROUND OF THE INVENTION

Fender covers are utilized by mechanics and the like to protect the finish of a vehicle exterior surface while permitting the mechanic to lean on the surface to attend to repairs on the vehicle. Fender covers are well known in the art, and have conventionally relied upon magnets attached along one edge of the cover to secure the cover in position. However, as modern vehicles rely more on plastics, and less on ferrous metals, the use of magnets as a securement apparatus is becoming unworkable. Obviously, a magnetic securement device is only operable if there is an appropriate metal present to which the magnet will attach.

Another problem with prior art fender covers is the difficulty in storing the covers when not in use. Typically, the prior art covers are a thick sheet of rubber or similar material, and have a rigid upper edge with magnets attached thereto, to permit attachment to a vehicle. This rigid edge prevents folding of the cover to a small easily stored and transported condition.

SUMMARY OF THE INVENTION

It is therefore a general object of the present invention to provide an improved non-magnetically secured fender cover.

Another object is to provide a fender cover which may be attached to a wide variety of vehicles of different sizes and shapes, and vehicles which are comprised of components which are not susceptible to magnetic securement devices.

Still another object is to provide a fender cover which may be easily folded for storage or transportation.

These and other objects of the present invention will be apparent to those skilled in the art.

The fender cover of the present invention includes a generally planar sheet of resilient, flexible, pliant, water-impervious material with a plurality of pockets formed along one edge. The pockets are filled with a high density deformable flowable material such as sand, and are separated by flat valleys, to permit folding of the sheet between the pockets. A first ridge is formed in the sheet proximal the pockets in extending between the side edges, and projecting upwardly from the sheet. A second ridge is formed parallel and rearwardly of the first ridge and also extends from side edge to side edge. Both ridges are preferably formed of loops of the material, gathered together and affixed in a loop. Each ridge forms a hinge-type joint permitting pivotal movement of the pockets to a position generally perpendicular to the sheet at a location rearward of the ridge.

DESCRIPTION OF THE PREFERRED EMBODIMENT

Figure 1:
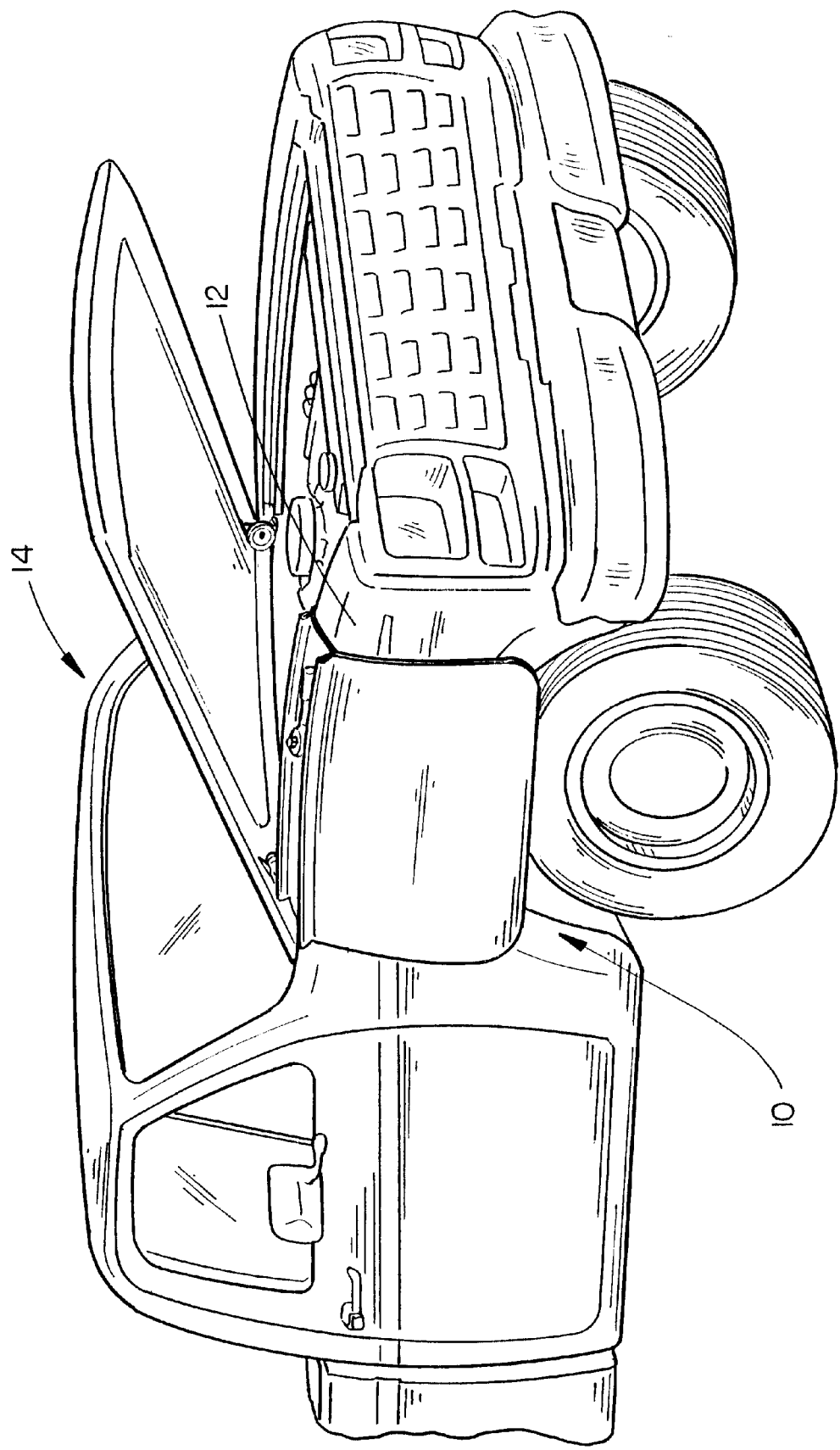
FIG. 1 is a perspective view of the fender cover of the present invention in use on a vehicle.

Referring now to the drawings, in which similar or corresponding parts are identified with the same reference numeral and more particularly to FIG. 1, the fender cover of the present invention is designated generally at 10 and is shown in use on a fender 12 of a vehicle 14.

Figure 2:
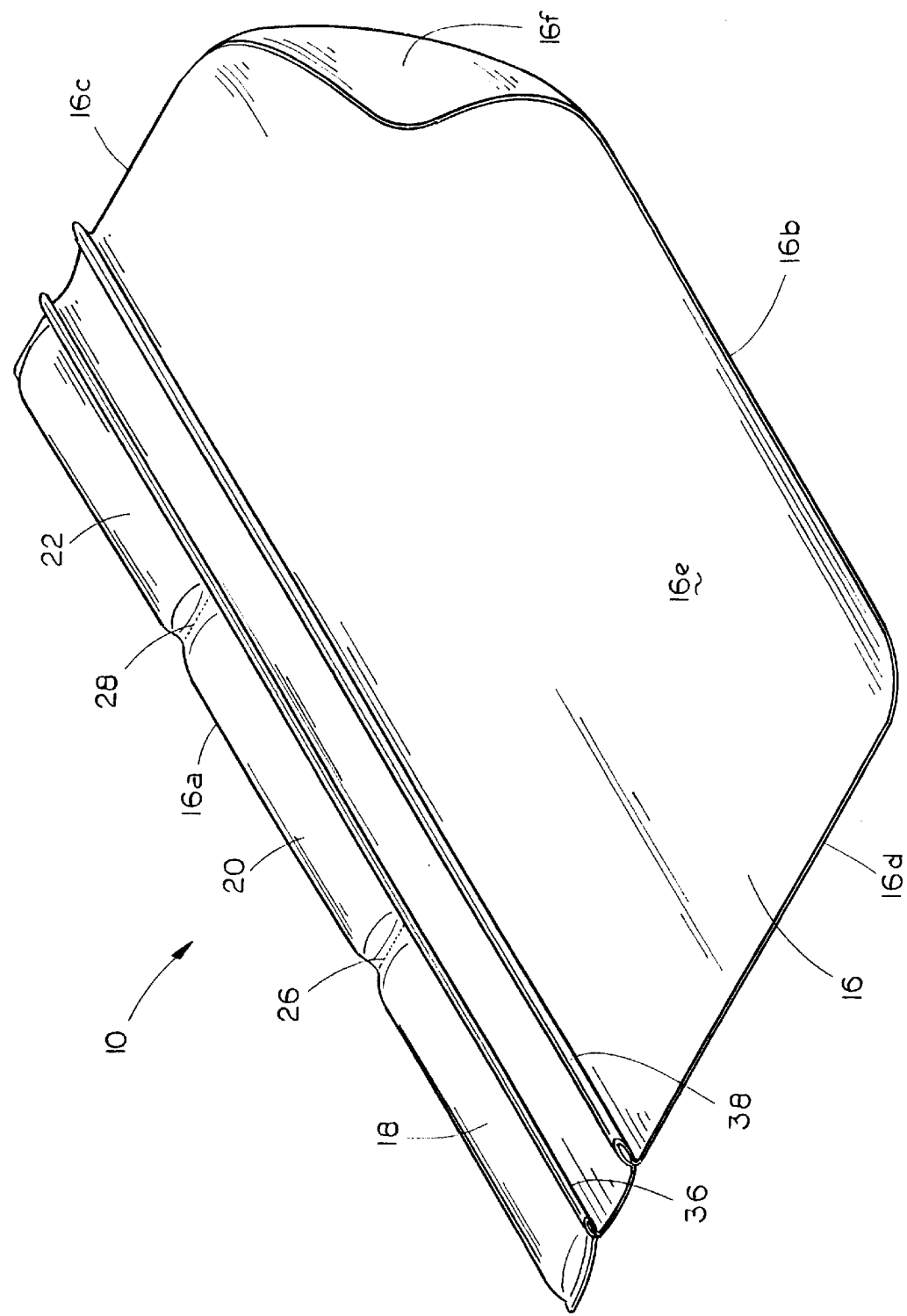
FIG. 2 is an enlarged perspective view of the fender cover.

Referring now to FIG. 2, fender cover 10 is composed of a sheet 16 of water impervious, resilient, compressible, flexible material. The inventor has found vinyl, and various elastomeric materials, to be acceptable for use as sheet 16. Sheet 16 includes forward and rearward edges 16a and 16b, opposing transverse side edges 16c and 16d, and upper and lower faces 16e and 16f respectively. Sheet 16 may also be laminated, with a non-slip layer on the rearward surface, and water impervious layer on the upper surface. However, the lamination must be resilient, compressible, and flexible, to permit use as a fender cover of the present invention.

Figure 5:
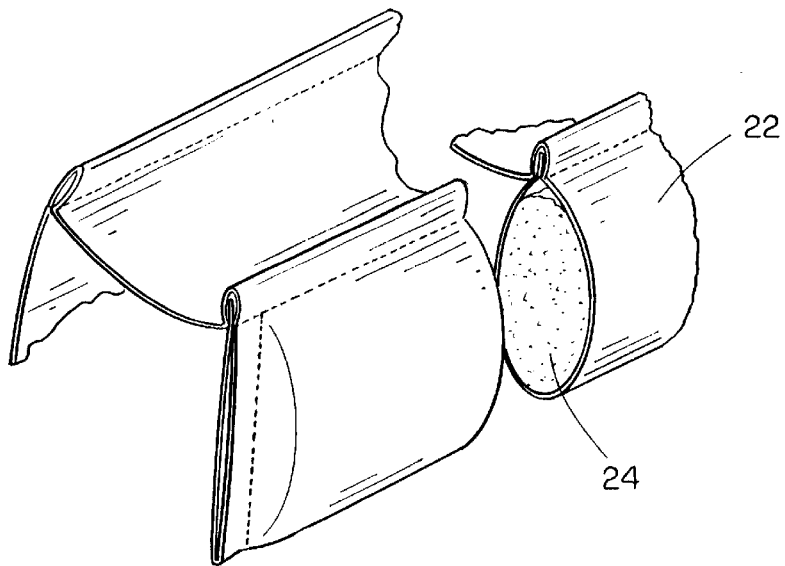
FIG. 5 is an enlarged perspective view of the fender cover, with portions in section to display the interior thereof.

Three enclosed pockets 18, 20, and 22 are formed along the forward edge 16a of sheet 16. Each pocket 18, 20, and 22 is filled with a high density flowable material, such as sand 24 (shown in FIG. 5) which thereby permits pockets 18, 20, and 22 to be deformed to conform to the shape of the surface upon which the fender cover is being used. Obviously, other heavy, deformable materials may also be used, and it would be possible to substitute high density nondeformable materials if additional pockets of very short length are utilized.

Figure 4:
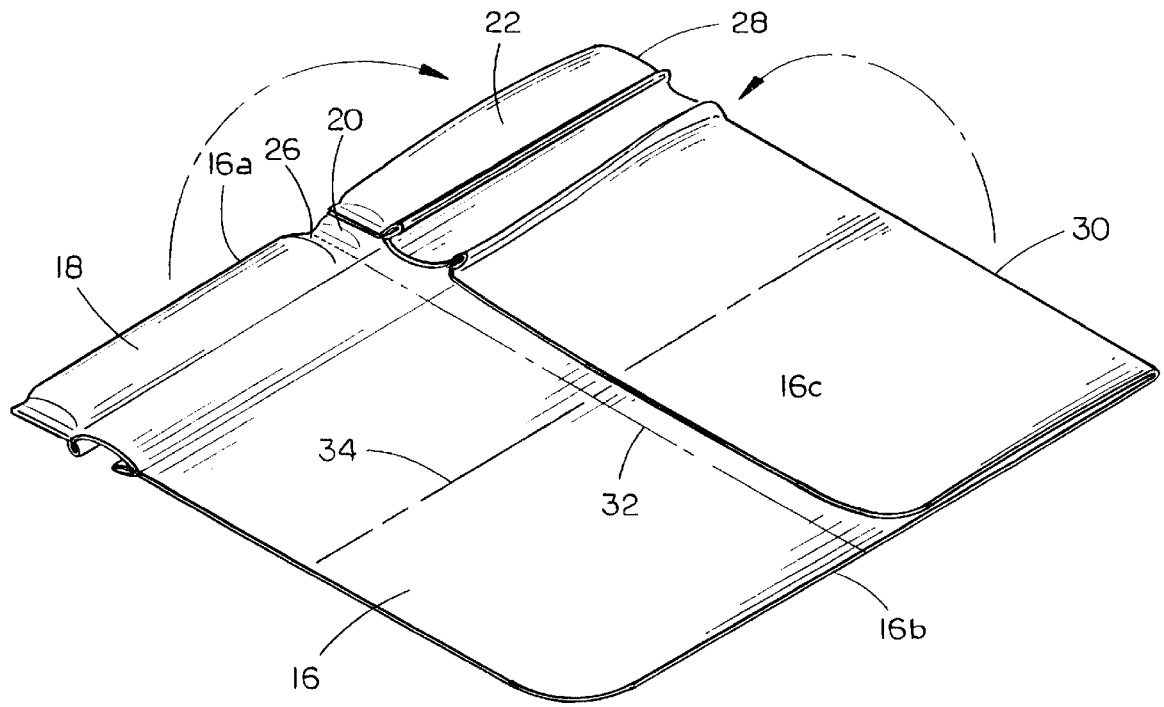
FIG. 4 is an enlarged perspective view of the fender cover showing the steps utilized in configuring the cover for storage and transport.

As shown in FIG. 2, pockets 18, 20, and 22 are separated by flat stitched valleys 26 and 28. Valley 26 is positioned between pockets 18 and 20, and valley 28 is positioned between pockets 20 and 22, the valleys extending the complete width of the pockets, parallel to side edges 16c and 16d. Valleys 26 and 28 will permit sheet 16 to be folded along a transverse axis, as shown in FIG. 4. Thus, pocket 22 is folded over a top pocket 20 along a transverse fold 30 which is aligned with the stitched valley 28, parallel to side edge 16c. Pocket 18 may then be subsequently folded along fold line 32, aligned with valley 26, atop pocket 22, such that sheet 16 is folded into an orientation only one-third as wide as the original unfolded sheet. Because sheet 16 is formed of a thin flexible material, the sheet may be further folded along fold line 34, oriented parallel to forward and rearward edges 16a and 16b. Further folding along lines parallel to fold line 34 may also be possible, if it is desired to further reduce the size of the folded sheet 16.

Referring once again to FIG. 2, a ridge 36 is formed in sheet 16 which projects upwardly from the upper face 16e, and extends parallel to forward edge 16a from side edge 16c to side edge 16d. Ridge 36 may be simply and easily formed by gathering a small loop of material and stitching the halves of the loop together. Ridge 36 is located adjacent the rearward edges of pockets 18, 20, and 22, and also serves as a hinge-type joint (shown more clearly in FIG. 3A).

A second ridge 38 projects upwardly from upper face 16e of sheet 16, and extends parallel to the first ridge 36, and is spaced rearwardly therefrom. Ridge 38 may be formed in the same manner as ridge 36, and assists in retaining tools between the first and second ridges 36 and 38 when positioned on fender 12 (as shown in FIG. 3A).

Figure 3A:
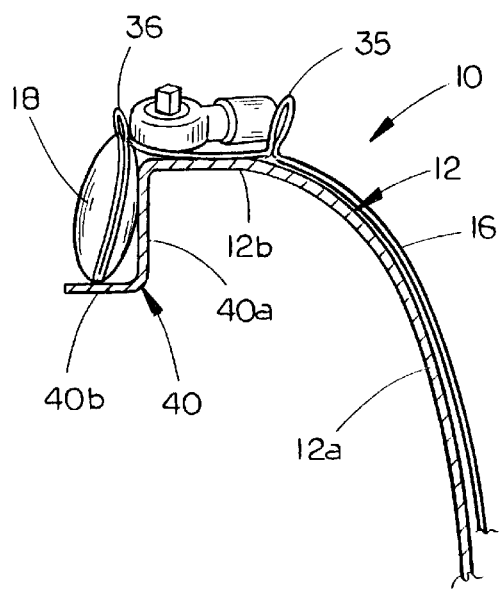
FIG. 3A is a side elevational view of the fender cover with a sectional view through a portion of a vehicle, to show the fender cover in use.

FIG. 3A shows a cross-sectional view through fender 12, the fender including an outer portion 12a extending vertically upwardly to a horizontally disposed upper portion 12b, and is then bent downwardly and thence inwardly to form a generally L-shaped channel 40 having a vertical leg 40a and a horizontal leg 40b. Fender cover 10 is positioned on fender 12 by resting pockets 18, 20, and 22 in channel 40. The remainder of sheet 16 is bent at the hinge-type joint of ridge 36 to cover upper portion 12b and outer portion 12a of fender 12. Because of the weights within pockets 18, 20, and 22, and the position of the weights below the ridge 36, it can be seen that fender cover 10 will be retained in position, and resist the outward and downward forces which may be applied to the fender cover.

Figure 3B:
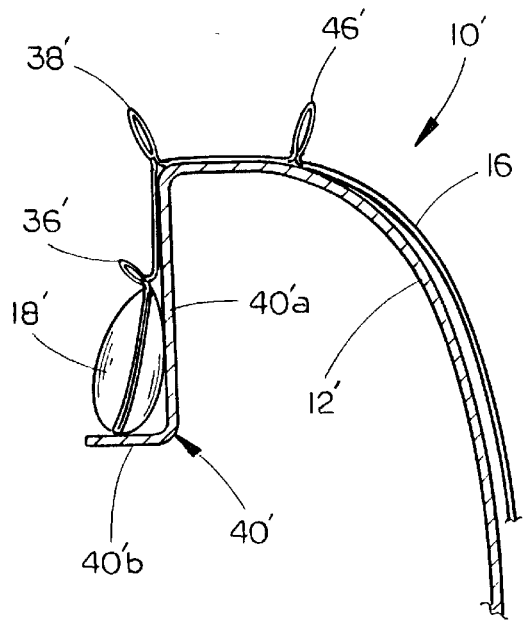
FIG. 3B is a view similar to FIG. 3A, showing a second embodiment of the invention on a vehicle of a different configuration.
Figure 3C:
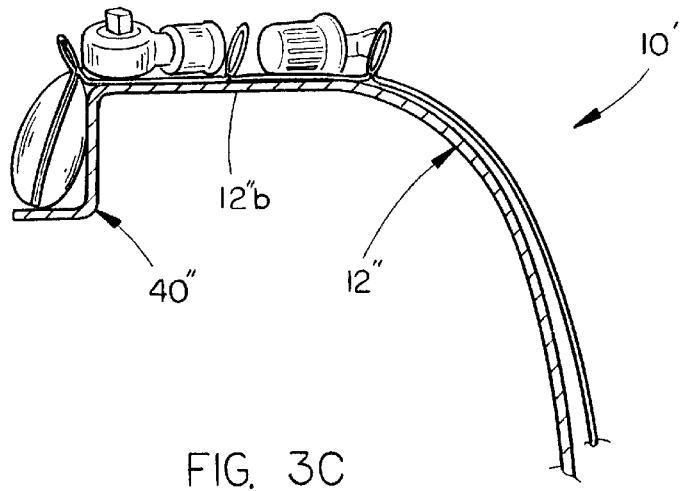
FIG. 3C is a view similar to FIG. 3B, showing the second embodiment of the invention on yet a third configuration of a vehicle.

Referring now to FIGS. 3B and 3C, a second embodiment of the fender cover is designated generally at 10'. Fender cover 10' is the same as fender cover 10, except that an additional ridge 46 is formed on the outer face of sheet 16, spaced rearwardly and parallel to second ridge 38. A second embodiment of a fender is shown at 12' in FIG. 3B, which has a deeper channel 40' with a vertical leg 40'a longer than the vertical leg 40a of fender 12 (shown in FIG. 3A). With this type of fender, it can be seen that second ridge 38 will form the hinge-type joint, permitting the weighted pockets to rest on the horizontal leg 40'b of channel 40'. The third ridge 46' creates a space between second ridge 38' and third ridge 46', which will retain tools and the like.

FIG. 3C shows yet another variation of the fender, designated generally at 12". Fender 12" has an extra wide upper portion 12"b, with a channel 40" having similar dimensions to the channel 40 of fender 12. Fender cover 10' can be seen to cover and protect this additional variation in the fender 12".

Whereas the invention has been shown and described in connection with the preferred embodiment thereof, many modifications, substitutions and additions may be made which are within the intended broad scope of the appended claims.

I claim:

1. A fender cover, comprising:

a generally planar sheet of resilient, flexible, pliant, water-impervious material, having forward and rearward edges, opposing side edges, and upper and lower faces;

a plurality of pockets formed along the entire length of the forward edge, adjacent pockets being separated by a flat valley, extending transversely from the forward edge and permitting folding of the sheet along each valley on a transverse axis; and each of each plurality of pockets being filled with a high density material, to form weights therein;

said weights being formed of a deformable, flowable material.

2. The fender cover of claim 1, further comprising an upwardly projecting ridge formed on the sheet and extending adjacent the pockets from side edge to side edge.

3. The fender cover of claim 2, wherein a portion of the sheet is gathered and affixed into a loop to form said ridge.

4. The fender cover of claim 3, further comprising an upwardly projecting second ridge formed on the sheet, parallel and spaced rearwardly of the first ridge and extending from side edge to side edge.

5. The fender cover of claim 4, wherein a portion of the sheet is gathered and affixed into a loop to form said second ridge.

6. A fender cover, comprising:

a generally planar sheet of resilient, flexible, pliant, water impervious material, having forward and rearward edges, opposing side edges, and upper and lower faces;

a plurality of pockets formed along the entire length of the forward edge, adjacent pockets being separated by a flat valley, extending transversely from the forward edge and permitting folding of the sheet along each valley on a transverse axis; and each of each plurality of pockets being filled with a high density material, to form weights therein;

said weights being formed of a flowable material.

7. A fender cover, comprising:

a generally planar sheet of resilient, flexible, pliant, water-impervious material, having forward and rearward edges, opposing side edges, and upper and lower faces;

a plurality of pockets formed along the entire length of the forward edge, adjacent pockets being separated by a flat valley, extending transversely from the forward edge and permitting folding of the sheet along each valley on a transverse axis; and each of each plurality of pockets being filled with a high density material, to form weights therein;

an upwardly projecting first ridge formed on said sheet extending adjacent said pockets from side edge to said edge;

and an upwardly projecting second ridge formed on said sheet, parallel and spaced rearwardly of said first ridge and extending from side edge to side edge.

8. The fender cover of claim 7, further comprising an upwardly projecting third ridge formed in the sheet, parallel and spaced rearwardly of the second ridge and extending from side edge to side edge.

9. A fender cover, comprising:

a generally planar sheet of resilient, flexible, pliant, water-impervious material, having forward and rearward edges, opposing side edges, and upper and lower faces;

a plurality of pockets formed along the entire length of the forward edge, adjacent pockets being separated by a flat valley, extending transversely from the forward edge and permitting folding of the sheet along each valley on a transverse axis; and each of each plurality of pockets being filled with a high density material, to form weights therein;

said weights being formed of a deformable, flowable material;

an upwardly projecting first ridge formed on said sheet and extending adjacent the pockets from side edge to side edge;

a portion of said sheet being gathered and affixed into a loop to form said first ridge;

an upwardly projecting second ridge formed on said sheet, parallel and spaced rearwardly of said first ridge and extending from side edge to side edge;

a portion of said sheet being gathered and affixed into a loop to form said second ridge;

said first ridge forming a hinge joint in said sheet permitting pivotal movement of said pockets to an orientation generally perpendicular to a portion of said sheet rearward of said first ridge.

10. The fender cover of claim 9, wherein said second ridge forms a hinge joint in the sheet permitting pivotal movement of the pockets and a portion of the sheet forward of the second ridge to an orientation generally perpendicular to a portion of the sheet rearward of the second ridge.

11. The fender cover of claim 10, further comprising an upwardly projecting third ridge formed in the sheet, parallel and spaced rearwardly of the second ridge and extending from side edge to side edge.

* * * * *